Figure 1:
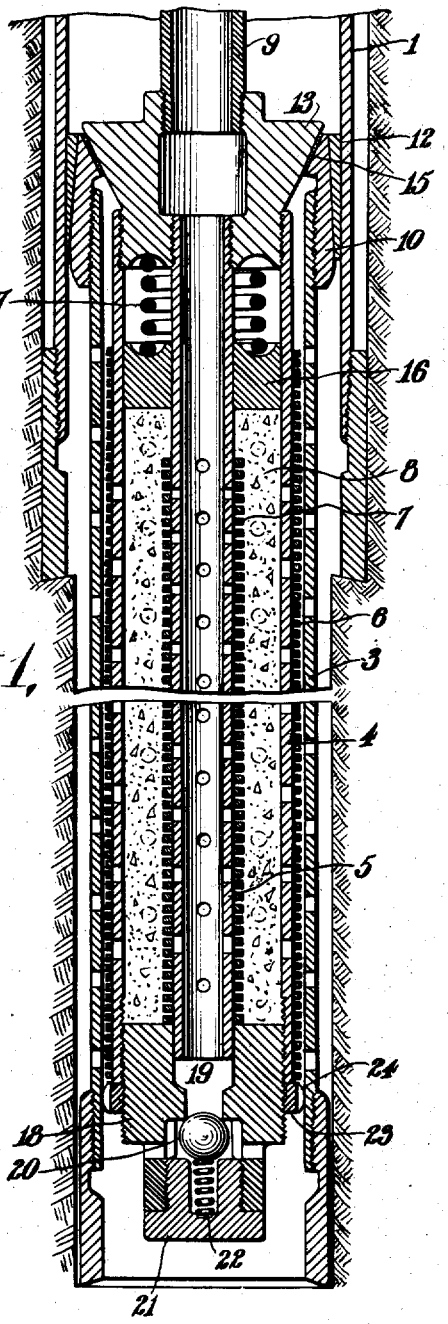

C. N. SCOTT.

OIL WELL SCREEN.

APPLICATION FILED APR. 11, 1919.

Reissued Nov. 18, 1919. 14,756.

INVENTOR.

Clarence N. Scott

BY

R. H. Earbour

ATTORNEY.

UNITED STATES PATENT OFFICE.

CLARENCE N. SCOTT, OF HOUSTON, TEXAS, ASSIGNOR, BY MESNE ASSIGNMENTS, TO THE TEXAS COMPANY, A CORPORATION OF TEXAS.

OIL-WELL SCREEN.

14,756. Specification of Reissued Letters Patent. Reissued Nov. 18, 1919.

Original No. 1,272,540, dated July 16, 1918, Serial No. 128,946, filed November 1, 1916. Application for reissue filed April 11, 1919. Serial No. 289,437.

*To all whom it may concern:*

Be it known that I, CLARENCE N. SCOTT, a subject of the King of Great Britain, residing at Houston, Harris county, State of Texas, have invented certain new and useful Improvements in Oil-Well Screens, of which the following is a specification.

My invention relates to means for preventing the choking of oil and gas wells with sand, and has special reference to screens or strainers which are located in the oil stratum and are sealed to the casing at the bottom of the well.

Metal strainers or screens have been used in oil and gas wells for holding back the sand in order to allow the oil to flow, by preventing the clogging of the well. However, when oil wells have been drilled into a stratum containing a large quantity of fine sand as well as coarser sand, great difficulty has been experienced in making the well produce for any length of time, because the usual metal screens are rapidly destroyed by the cutting action of the fine sand as it passes with the oil through the small openings of the screen.

If a screen could be made sufficiently fine to hold back the fine sand as well as the coarser sand, the fine sand would pack around the outside of the screen and prevent any materinal flow of oil.

One object of my invention is to provide a strainer or screen that shall be adapted to permit fine particles of sand to pass through and out of the well without cutting the strainer, thus making it possible for the uncut permanent strainer to hold back the coarser particles of sand, building up a large bed of this coarser sand around the outside of the strainer, and thus permitting the free flow of oil and materially increasing the production of the well.

In the carrying out of my invention I prefer to utilize a screen composed of an aggregate such as, for example, a mass of granular particles of carborundum or other hard substance packed between perforated retaining walls of metal or spaced screens.

The granular particles of carborundum or the like are held firmly packed by a spring or other suitable means which holds the mass under compression and prevents any movement of the particles within the retaining walls. The carborundum particles are of sufficient size to allow fine sand to pass through the interstices, but they are sufficiently hard to resist all wear due to the passage of the fine sand.

By the use of my invention an oil stratum containing very fine sand is soon converted into a stratum composed entirely of relatively coarse sand, through which the oil readily flows and it enables large quantities of oil to be produced in fields which have not hitherto been available.

Other objects and advantages of my invention will be set forth hereinafter, and in order that my invention may be thoroughly understood I will now proceed to describe the same in detail in the following specification and will then point out the novel features thereof in appended claims.

Figure 2:
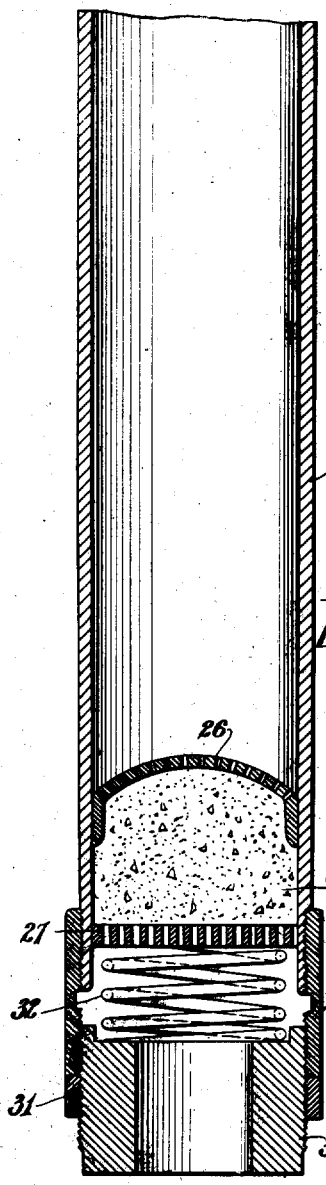

Figure 1 is a vertical sectional view of a screen which constitutes one embodiment of my invention, and Fig. 2 is a vertical sectional view of a modified form thereof.

Referring now more particularly to Fig. 1 of the drawings, the numeral 1 designates a well casing which is set in the bore and which extends down well toward the bottom thereof. The bore is usually contracted below the lower end of this casing, forming an annular shoulder which supports the casing, the lower or contracted part of the bore extending through the oil stratum and receiving the perforated liner 3, as shown in Fig. 1. The screen proper comprises two concentrically arranged foraminous pipes 4 and 5, each of which has a plurality of perforations or slots to permit the free inflow of fluid and may be wrapped with screen wire as 6 and 7 in the well known manner, said wire being secured to the outer side of said pipes in any preferred manner and the spirals or turns thereof, being spaced apart, forming slits through which the fluid and sands may enter but which prevent the escape of the granular particles of carborundum or other material placed to be retained between pipes 4 and 5. Said pipes 4 and 5 are to be wrapped with wire from end to end as shown in the drawing; or the perforations or slots in the pipes 4 and 5 may be sufficiently small as to require no wire wrapping. The perforated liner 3 fits comparatively closely over the screen pipe 4 but the inner screen pipe 5 is spaced a considerable distance from the pipe 4, being considerably smaller in diameter, so as to provide an intervening space for the aggregate 8, which is composed preferably of small particles of carborundum. The oil passing through the screening pipe 4 is freed of the greater part of the coarse sand and detritus therein and enters the inner screen pipe 5 and is delivered through the tube 9 to the surface of the ground. The upper end of the pipe 3 is threaded into a collar 10 which is secured in the lower end of the casing 1 by means of a lead seal 12. The upper end of the collar 10 flares outwardly and supports the coupling member 13 and interposed between this coupling member and the collar is the gasket 15 formed of leather or other suitable material. The lower end of the coupling 13 is reduced and outwardly threaded and receives the upper end of the screen pipe 4 and said coupling has a central passageway therethrough into which the screen pipe 5 and the alined tube 9 are threaded as shown. Surrounding the screen pipe 5 near its upper end and resting against the aggregate 8 is an annular collar 16, interposed between which and the coupling 13 is a coil spring 17 which holds said collar against said aggregate to keep the same closely packed. Threaded into the lower end of the pipe 4 is a valve seat 18 having a fluid passageway 19 therethrough which is controlled by the ball valve 20. The passageway 19 separates into a plurality of radiating passageways below said seat. Into the lower end of the seat 18 a plug 21 is screwed, having a coil spring 22 which normally rests against the valve 20 and holds the same closed and prevents the admission of oil from beneath, up through the passageway 19. A ring nut 23 is threaded onto the seat 18 and has a plurality of circumferentially distributed spacers 24 which hold the pipe 4 centered and the lower end of the screen pipe 5 projects into the passageway 19 of the seat and said pipe is thereby held centered relative to the screen. In case it is desired to wash the screen out, water is forced down through the tube 9, and the pressure thereof unseats the valve 20 and permits the fluid to pass out through the lower end of the screen and up and out through the annular space between pipes 3 and 4 when the member 13 is raised off of its seat.

In Fig. 2, I have shown a modified form of screen wherein the numeral 25 indicates a pipe which has a foraminous or perforated plate 26 fixed therein and spaced underneath this plate is a foraminous or perforated disk 27. Interposed between said plate and disk is a quantity of aggregate 28 preferably composed of small particles of carborundum. Secured onto the lower end of pipe 25 is a collar 29 whose lower end receives a gland 30 which is held in position by means of the locking ring 31. Interposed between the gland 30 and the disk 27 is a strong coil spring 32 which operates against said disk and holds the aggregate 28 closely packed together. In this form of screen, the oil flows through the perforations in the disk 27 and percolates through the aggregate 28 and passes thence through the perforations of the plate 26 into the pipe 25 and thence to the surface of the ground as hereinbefore explained.

The term "oil well outlet" as used in the claims is intended to refer broadly to the casing or tubing or whatever conducts the oil and gas from the well. Furthermore, the term "oil well" is used broadly throughout the specification and claims as referring to oil and gas wells or wells producing both oil and gas.

I am aware that filters have been constructed of perforated retaining walls or screens between which granular particles, such as powdered charcoal, are packed. Filters of this character are, however, arranged and adapted to separate out all particles held in suspension in the liquid to be filtered, and they depend on the porosity of the material instead of on the interstices formed between the particles. The screen of my invention, on the other hand, utilizes carborundum particles or a similar aggregate in which the particles are non-porous and in which they are of sufficient size to form interstices which constitute passages through which fine oil sand may flow. In other words, my invention may be properly described as an aggregate screen and not as a filter.

Having thus described the invention, what is claimed and desired to be secured by Letters Patent is:

1. The combination of a pipe adapted to extend into a well and deliver liquid or gas therefrom normally closed at its lower end but having a foraminous portion near that end, with a foraminous pipe surrounding and concentric with the foraminous portion of said first mentioned pipe, a closely packed filling of fine hard material between said foraminous portions, and a spring pressed collar between said pipes bearing on said granular material to keep it closely packed.

2. The combination of a well casing having an interior collar near the bottom, with a perforated pipe extending downwardly from said collar, a conducting pipe extending into said casing having a surrounding collar resting on said first mentioned collar, a foraminous section constituting a continuation of said conducting pipe below said collars, a foraminous pipe spaced from and surrounding the foraminous portions of said foraminous section, a closely packed filling of fine hard granular material between said foraminous pipes, and an outwardly opening automatic valve at the lower end of the foraminous section of said conducting pipe.

3. The combination of a well casing having an interior collar near the bottom, with a perforated pipe extending downwardly from said collar, a conducting pipe extending into said casing having a surrounding collar resting on said first mentioned collar, a foraminous section constituting a continuation of said conducting pipe below said collars, a foraminous pipe spaced from and surrounding the foraminous portion of said foraminous section, a closely packed filling of fine hard granular material between said foraminous pipes, and means for exerting a yielding pressure on said filling to keep it tightly packed.

4. The combination of a well casing having an interior collar near the bottom, with a perforated pipe extending downwardly from said collar, a conducting pipe extending into said casing having a surrounding collar resting on said first mentioned collar, a foraminous section constituting a continuation of said conducting pipe below said collars, a foraminous pipe spaced from and surrounding the foraminous portion of said foraminous section, a closely packed filling of fine hard granular material between said foraminous pipes, and a spring pressed collar between said foraminous section and surrounding foraminous pipe bearing on the upper surface of said filling material.

5. The combination with a tubular well casing having an inwardly extending tapering seat on its interior near the bottom, of a conducting pipe extending into said casing having an external tapering seat fitting and making close joint with said seat on said casing, concentric foraminous tubular extensions of said conducting pipe below said seats, a closely packed filling of hard fine granular material between said concentric foraminous extensions, means for closing the lower end of said extensions, and an automatic outwardly opening valve in said closure at the lower end of the inner concentric extension.

6. The combination with a tubular well casing having an inwardly extending tapering seat on its interior near the bottom, of a conducting pipe extending into said casing having an external tapering seat fitting and making close joint with said seat on said casing, concentric foraminous tubular extensions of said conducting pipe below said seats, a closely packed filling of hard fine granular material between said concentric foraminous extensions, means for closing the lower end of said extensions, and a spring pressed ring at the upper ends of said foraminous extensions bearing on said granular material to keep it closely packed.

7. The combination of an oil well outlet and means for holding back the coarser sand of the oil stratum without interfering with the continuous flow of the fine sand with the oil, said means comprising a screen composed of an aggregate of carborundum particles.

8. The combination of an oil well outlet and means for holding back the coarser sand of the oil stratum without interfering with the flow of the fine sand with the oil, said means comprising a screen composed of an aggregate of particles which are hard relative to the fine sand which is permitted to flow through the screen with the oil.

In testimony whereof I affix my signature, this 3rd day of April, 1919.

CLARENCE N. SCOTT.